United States Patent
Meier et al.

(10) Patent No.: US 8,822,613 B2
(45) Date of Patent: Sep. 2, 2014

(54) PROCESS FOR PREPARING A (METH)ACRYLATE COPOLYMER CONTAINING QUATERNARY AMMONIUM GROUPS BY FREE-RADICAL POLYMERIZATION IN SOLUTION

(75) Inventors: Christian Meier, Darmstadt (DE); Andreas Weber, Frankfurt (DE); Johannes Vorholz, Alzenau (DE); Alpertunga Kueksal, Nuremberg (DE); Andreas Klosendorf, Bad Schwalbach (DE); Pamela Boehmann, Weiterstadt (DE); Marcus Denger, Brensbach (DE); Norbert Hoffmann, Griesheim (DE); Nikolaos Papadopoulos, Ginsheim-Gustavsburg (DE)

(73) Assignee: Evonik Röhm GmbH, Darmstadt (DE)

(*) Notice: Subject to any disclaimer, the term of this patent is extended or adjusted under 35 U.S.C. 154(b) by 9 days.

(21) Appl. No.: 13/805,523

(22) PCT Filed: Oct. 13, 2010

(86) PCT No.: PCT/EP2010/065333
§ 371 (c)(1),
(2), (4) Date: Dec. 19, 2012

(87) PCT Pub. No.: WO2012/048742
PCT Pub. Date: Apr. 19, 2012

(65) Prior Publication Data
US 2013/0096272 A1    Apr. 18, 2013

(51) Int. Cl.
C08F 2/06    (2006.01)

(52) U.S. Cl.
USPC ......... 526/212; 526/312; 526/328; 526/328.5

(58) Field of Classification Search
CPC ............ C08F 2/06; C08F 20/14; C08F 20/18; C08F 20/34; C08F 220/14; C08F 220/18; C08F 220/34
See application file for complete search history.

(56) References Cited

U.S. PATENT DOCUMENTS

| | | | |
|---|---|---|---|
| 4,737,357 A | 4/1988 | Lehmann et al. | |
| 6,994,865 B2* | 2/2006 | Branham et al. | 424/402 |
| 7,157,389 B2* | 1/2007 | Branham et al. | 442/102 |
| 7,456,117 B2* | 11/2008 | Branham et al. | 442/102 |
| 2004/0055704 A1* | 3/2004 | Bunyard et al. | 156/305 |
| 2005/0271778 A1* | 12/2005 | Petereit et al. | 426/302 |
| 2006/0116470 A1 | 6/2006 | Gauweiler et al. | |
| 2008/0206324 A1* | 8/2008 | Gryczke et al. | 424/463 |

FOREIGN PATENT DOCUMENTS

EP    1 396 508    3/2004

OTHER PUBLICATIONS

Fefelova et al. International Journal of Pharmaceutics 2007, 339, 25-32.*
U.S. Appl. No. 13/876,277, filed Mar. 27, 2013, Meier, et al.
International Search Report Issued Dec. 2, 2010 in PCT/EP10/65333 Filed Oct. 13, 2010.

* cited by examiner

*Primary Examiner* — Vu A Nguyen
(74) *Attorney, Agent, or Firm* — Oblon, Spivak, McClelland, Maier & Neustadt, L.L.P.

(57) ABSTRACT

The invention relates to a process for preparing a (meth) acrylate copolymer containing quaternary ammonium groups from a monomer mixture selected from: (a) 80 to 99% by weight of a C1-C4-alkyl ester of acrylic acid or methacrylic acid; and (b) 20 to 1% by weight of an alkyl ester of acrylic acid or methacrylic acid with a quaternary ammonium group in the alkyl radical; and (c) 0 to 10% of further copolymerizable vinyl monomers whereby one or more polymerization initiators, optionally one or more molecular weight regulators and one or more solvents or of a solvent mixture are added to the monomer mixture to give a polymerization mixture, which is polymerized at temperatures from 30 to 120 C over a period of 2 to 24 hours, where the polymerization mixture is polymerized to a polymerization syrup with a conversion of the monomers to the copolymer of at least 99% by weight, where the polymerization syrup is subsequently degassed by distillation or by extrusion and the degassed polymerization syrup is further comminuted to a copolymer preparation in the form of a granulate or powder and where the copolymer preparation is characterized by a molecular weight (Mw) of 25.000 to 50.000, a polydispersity index of 2.0 to 3.0 and a residual solvent concentration of less than 10.000 ppm by weight.

18 Claims, No Drawings

PROCESS FOR PREPARING A (METH)ACRYLATE COPOLYMER CONTAINING QUATERNARY AMMONIUM GROUPS BY FREE-RADICAL POLYMERIZATION IN SOLUTION

TECHNICAL BACKGROUND

U.S. Pat. No. 5,804,676 describes a process for preparing a polymer from a monomer mixture comprising 75% by weight or more of methyl methacrylate and 25% by weight or less of an alkyl acrylate in a homogeneous solution state in the presence of a polymerization initiator and a chain transfer agent. The polymerizate may contain 5-55% by weight of the monomer and 5 to 65% by weight of the solvent. The polymerizate containing volatiles is directly fed to a feed opening of an extruder having a barrel, a screw and a plurality of vents and the barrel being at a temperature of 170 to 270° C. The polymerizate is extruded through the extruder while substantially all volatiles are separated and recovered through a first vent of the extruder and remaining volatiles are separated through being removed trough at least one other vent disposed downstream of the first vent. The thermal decomposition rate is 3.0% by weight or less.

EP 0 694 565 A describes a process for the homogeneous polymerization of water insoluble polymers containing greater than 50% by weight of monomers selected from the group consisting of $C_1$-$C_{18}$ alkyl acrylate or methacrylate esters, N-substituted acryl or methacrylamides and mixtures thereof in substantially non-aqueous solutions. Water soluble polymerization initiators like for instance ammonium persulfate are dissolved in a sufficient amount of water whereby the amount of water does not exceed 25% by weight of the total solution. The polymers prepared by this process are devoid of undesirable initiator decomposition by-products.

U.S. Pat. No. 4,737,357 describes an aqueous dispersion of a water swellable but water-insoluble polymer formed between a quaternary ammonium monomer and a nonionic monomer. The copolymers described may be of the type EUDRAGIT® RS or EUDRAGIT® RL. It is generally mentioned that these kinds of copolymers may be produced by bulk polymerization or by solution or precipitation polymerization in an organic solvent, the polymer formed then being isolated from the solvent.

WO 2007/082868A1 relates to processes for preparing polymers which contain 50-90% by weight of at least one ester of (meth)acrylic acid, 5-50% by weight of at least one olefinically unsaturated, free-radically polymerizable anionogenic or anionic compound and further free-radically polymerizable compound in copolymerized form, by free-radical polymerization in a solution comprising alcohol, wherein the polymerization initiator used is at least one water-soluble initiator.

WO 2007/113129A1 relates to processes for preparing polymers by free-radical polymerization in a solution, which is characterized in that the polymerization initiator used is an ethanol-soluble initiator and the solution polymerization is performed in an alcoholic solvent which contains from 5 to 50% by weight of water.

CN 101475662A relates to a process for preparing polymethacrylamide ester of low membrane forming temperature and moderate permeability for pharmaceutical use. Such a polymer may be composed from ethyl acrylate, butyl acrylate, methyl methacrylate and trimethylammoniumethyl methacrylate chloride. The monomer composition to be polymerized is dissolved in comparably small amounts of solvents, 5-15% by weight.

PROBLEM AND SOLUTION

It is known, for instance from U.S. Pat. No. 4,737,357, that (meth)acrylate copolymers containing quaternary ammonium groups, especially those from the well known type of EUDRAGIT® RS or EUDRAGIT® RL, may be produced by radical polymerization in solution. However in the past these kinds of copolymers have permanently been produced by bulk polymerization in order to meet securely continuous high pharmaceutical standards which are required by authorities and customers. Details for a polymerization in solution which provide copolymer products which meet the same pharmaceutical requirements as the products which are commercially available are not reported so far. Thus it was an object of the present invention to provide a process for preparing a (meth)acrylate copolymer containing quaternary ammonium groups by free-radical polymerization in solution which meet the actual high pharmaceutical standards for the end product, especially for instance in respect to the molecular weight range, the polydispersity index range and the residual solvent and monomer concentrations. Since quite different types of monomers to be polymerized are employed in the process, the inventors had to adjust and to fix a lot of individual process steps at the same time to meet the pharmaceutical requirements. Thus the process reported and claimed here goes beyond the common knowledge of a person skilled in the art.

The problem is solved by a process for preparing a (meth)acrylate copolymer containing quaternary ammonium groups from a monomer mixture selected from a) 80 to 99% by weight of a $C_1$-$C_4$-alkyl ester of acrylic acid or methacrylic acid and b) 20 to 1% by weight of an alkyl ester of acrylic acid or methacrylic acid with a quaternary ammonium group in the alkyl radical and c) 0 to 10% of further copolymerizable vinyl monomers whereby one or more polymerization initiators, optionally one or more molecular weight regulators and one or more solvents or of a solvent mixture, are added to the monomer mixture to give a polymerization mixture, which is polymerized at temperatures from 30 to 120° C. over a period of 2 to 24 hours, where for the polymerization mixture finally at least 98% by weight of the following total amounts of components are used or consumed, 50 to 80% by weight of the monomer mixture, 0.01 to 0.5% by weight of one or more polymerization initiators 0 to 2% by weight of one or more molecular weight regulators, 50 to 20% by weight of a solvent or a solvent mixture wherein the monomers of the monomer mixture, the polymerization initiators and the molecular weight regulators dissolve, where the polymerization mixture is polymerized to a polymerization syrup with a conversion of the monomers to the copolymer of at least 99% by weight, where the polymerization syrup is subsequently degassed by distillation or by extrusion and the degassed polymerization syrup is further comminuted to a copolymer preparation in the form of a granulate or powder and where the copolymer preparation is characterized by a molecular weight (Mw) of 25.000 to 50.000, a polydispersity index of 2.0 to 3.2 and a residual solvent concentration of less than 10.000 ppm by weight.

DETAILS OF THE INVENTION

The invention relates to

A process for preparing a (meth)acrylate copolymer containing quaternary ammonium groups from a monomer mixture selected from
- a) 80 to 99, preferably 88 to 98% by weight of a $C_1$-$C_4$-alkyl ester of acrylic acid or methacrylic acid and
- b) 20 to 1, preferably 12 to 2% by weight of an alkyl ester of acrylic acid or methacrylic acid with a quaternary ammonium group in the alkyl radical and
- c) 0 to 10, preferably 1 to 5% or up to 10, up to 5, up to 2% by weight or any of further copolymerizable vinyl monomers whereby one or more polymerization initiators, one or more molecular weight regulators and one or more solvents or of a solvent mixture, are added to the monomer mixture to give a polymerization mixture, which is polymerized at temperatures from 30 to 120° C. over a period of 2 to 24 hours, where for the polymerization mixture finally at least 98% by weight of the following total amounts of components are used or consumed, 50 to 80, preferably 55 to 70% by weight of the monomer mixture, 0.01 to 5, preferably 0.01 to 0.5, preferably 0.05 to 0.2% by weight of one or more polymerization initiators 0 to 2, preferably 0.1 to 2, preferably 0.5 to 1.5% by weight of one or more molecular weight regulators, 50 to 20, preferably 25 to 35% by weight of a solvent or a solvent mixture wherein the monomers of the monomer mixture, the polymerization initiators and the molecular weight regulators dissolve, where the polymerization mixture is polymerized to a polymerization syrup with a conversion of the monomers to the copolymer of at least 99% by weight, where the polymerization syrup is subsequently degassed by distillation or by extrusion and the degassed polymerization syrup is further comminuted to a copolymer preparation in the form of a granulate or powder and where the copolymer preparation is characterized by a molecular weight (Mw) of 25.000 to 50.000, preferably 28.000 to 40.000 a polydispersity index of 2.0 to 3.2, preferably 2.0 to 3.0 and a residual (total) solvent concentration of less than 10.000, preferably less than 8000 ppm by weight.

Monomer Mixture

The monomer mixture may be selected from
- a) 80 to 99, preferably 88 to 98% by weight of a $C_1$-$C_4$-alkyl ester of acrylic acid or methacrylic acid and
- b) 20 to 1, preferably 12 to 2% by weight of an alkyl ester of acrylic acid or methacrylic acid with a quaternary ammonium group in the alkyl radical and
- c) 0 to 10, preferably 1 to 5% or up to 10, up to 5, up to 2% by weight or any of further copolymerizable vinyl monomers The copolymer may preferably comprise or consist essentially or exclusively of 90, 95 or 99 to 100% by weight of the monomers mentioned under a) and b).

Preferably the monomer mixture is consisting of 10-40% by weight of methyl methacrylate, 10-40% by weight of butyl methacrylate and 30-70% by weight of dimethylaminoethyl methacrylate.

Monomers a)

The term "a $C_1$-$C_4$-alkyl ester of acrylic acid or methacrylic acid" shall mean one or more $C_1$-$C_4$-alkyl ester of acrylic acid or methacrylic acid.

$C_1$-$C_4$-alkyl ester of acrylic acid or methacrylic acid are methyl acrylate, ethyl acrylate, propyl acrylate, butyl acrylate, methyl methacrylate, ethyl methacrylate, propyl methacrylate and butyl methacrylate.

Monomers b)

The term "an alkyl ester of acrylic acid or methacrylic acid with a quaternary ammonium group in the alkyl radical" shall mean one or more alkyl esters of acrylic acid or methacrylic acid with a quaternary ammonium group in the alkyl radical.

The particularly preferred (meth)acrylate monomer with quaternary amino groups is 2-trimethylammoniumethyl methacrylate chloride.

Optional Monomers c)

The term "further copolymerizable vinyl monomers" shall mean one or more further copolymerizable vinyl monomers.

The copolymer may preferably comprise or consist essentially or exclusively of 90, 95 or 99 to 100% by weight of the monomers mentioned under a) and b).

However, optionally it may be possible, without this necessarily leading to an impairment of the essential properties, for small amounts in the range from 0 to 10, 1 to 5% or up to 10, up to 5, up to 2% by weight of further copolymerizable vinyl monomers c), which are different from the monomers mentioned under a) and b), capable of vinylic copolymerization additionally to be present, such as, for example acrylic acid, methacrylic acid, in general (meth)acrylic compounds with functional amide or hydroxylgroups, for instance methacrylamid or hydroxyethyl methacrylate, vinylpyrrolidone, vinylmalonic acid, styrene, vinyl alcohol, vinyl acetate and/or derivatives thereof. Most preferred no essential amounts, less than 2% by weight or no further copolymerizable vinyl monomers at all are present in the copolymer to be polymerized.

Preferred Monomer Mixtures

Preferred suitable monomer mixtures for appropriate (meth)acrylate copolymers are disclosed for example in EP-A 181 515 or DE patent 1 617 751. These are polymers which are soluble or swellable irrespective of the pH and are suitable for medicament coatings.

Preferably the monomer mixture may consist of 85 to 98% by weight of free-radical polymerized $C_1$ to $C_4$ alkyl esters of acrylic or methacrylic acid and 15 to 2% by weight of (meth)acrylate monomers with a quaternary amino group in the alkyl radical.

Preferably the monomer mixture may consist of 65% by weight of methyl methacrylate, 30% by weight of ethyl acrylate and 5% by weight of 2-trimethylammoniumethyl methacrylate chloride (EUDRAGIT® RS).

Preferably the monomer mixture may consist of 60% by weight of methyl methacrylate, 30% by weight of ethyl acrylate and 10% by weight of 2-trimethylammoniumethyl methacrylate chloride (EUDRAGIT® RL).

Polymerization Mixture

One or more polymerization initiators, optionally one or more molecular weight regulators and one or more solvents or of a solvent mixture, are added to the monomer mixture to give a polymerization mixture, where for the polymerization mixture at least 98% by weight of the following total amounts of components are used (were used) or consumed (respectively), 50 to 80, preferably 55 to 70% by weight of the monomer mixture, 0 to 5, preferably 0.01 to 0.5, preferably 0.05 to 0.2% by weight of one or more polymerization initiators, 0 to 2, preferably 0.01 to 2, preferably 0.5 to 1.5% by weight of one or more molecular weight regulators, 50 to 20, preferably 25 to 35% by weight of a solvent or a solvent mixture wherein the monomers of the monomer mixture, the polymerization initiators and the molecular weight regulators dissolve, The term "used" shall express that the components were initially used during the polymerization process as a whole. The one or more solvent or the solvent mixture is still present at the end of the polymerization process before the volatile substances are removed. However essential amounts of monomers, the one or more polymerization initiators and the one or more molecular weight regulators that were initially given (were used) in the indicated amounts to the polymerization mixture have been reacted during the polymerization process and thus are no more quantitative present after at the end of the polymerization process. These substances that were used have been consumed during the polymerization process.

The components of the polymerization mixture usually add up to at least 98, preferably at least 99% by weight. In this case up to 2, preferably up to 1% of additional substances, different from the components explicitly mentioned, like for instance some kind of additives, like UV absorbers, dyes or colorants, may be present. The additional substances are not critical for the invention. However most preferred the components add up to 100% by weight.

Solvents

The polymerization mixture may comprise at the end of the polymerization process 20 to 40%, preferably 25 to 35% by weight of the one or more solvent or the solvent mixture.

The solvent or the solvent mixture may comprise or consist of at least more than 95% by weight, preferably at least more than 98% by weight, most preferably to 100% of a solvent or a mixture of solvents, which may be selected from the group of ethanol, methanol, iso-propyl alcohol, n-butyl alcohol, iso-butyl alcohol, tetrahydrofuran, methyl ethyl ketone, methyl iso-butyl ketone, dioxan, acetone, ethyl acetate or butyl acetate and less than 5% by weight, preferably less than 2% by weight of other solvents, like for instance water.

The solvent or the solvent mixture may preferably comprise or consist of to at least 98% by weight of ethanol and/or methanol, less than 2% by weight of water and less than 1% by weight of aliphatic solvents. Most preferably ethanol and/or methanol is used as the solvent.

The one or more solvent or the solvent mixture is preferably chosen in a way that the monomers of the monomer mixture, the polymerization initiator(s) and the molecular weight regulator(s) are capable to be dispersed or dissolved therein at the concentrations and conditions in which they are used during the process.

The monomer solvent mixture employed in the inventive process enables cooling via evaporation and condensation of the boiling components, mainly solvents.

Polymerization Initiators

The term "polymerization initiator" means a substance capable of initiating the free-radical polymerization of vinylic monomers by thermal or by spectral activation.

The polymerization mixture comprises or contains one or more polymerization initiators. Preferably the polymerization initiator(s) are chosen, so that they discompose near the boiling point of the solvents used.

Preferably the polymerization initiators which may be used are not water soluble. Water soluble initiators are at 20° C. and 1013 mbar to at least 1 g, preferably to at least 10 g soluble in 1 liter of water.

Suitable polymerization initiators in the sense the invention may be in general initiators of the peroxide- or of the azo-type. Certain suitable polymerization initiators in the sense the invention may be azobisisobutyronitrile (AIBN), dimethyl-2-2'-azobis-isobutyrate, tert-butylperpivalate or tert-butylper-2-ethylhexaonat or mixtures thereof.

Molecular Weight Regulators

The polymerization mixture may optionally comprise or contain one or more molecular weight regulators (chain transfer agents).

The term "molecular weight regulators" means a substance capable of limiting the molecular weight of a polymer during free-radical polymerization of vinylic monomers by chain transfer reactions.

A suitable molecular weight regulator is for instance n-butylmercaptan, n-dodecylmercaptan, 2-mercaptoethanol or 2-ethylhexylthioglycolate, most preferred is dodecylmercaptan.

Polymerization

The polymerization mixture may be polymerized at temperatures from 30 to 120, preferably 40 to 100, preferably 55 to 90° C.

The polymerization mixture may be polymerized over a period of 2 to 24, preferably 4 to 16 or 6 to 10 hours.

The polymerization may be carried out using the following steps

A polymerization reactor, for instance a 100 l stirred vessel, is inerted by addition of an inert gas like argon. Stirring may be around 60 to 80 rpm.

The monomer mixture preferably with addition of 5 to 15% by weight of solvent, preferably a mixture of ethanol and methanol, for example around 50 kg, is filled into the reactor.

The jacket temperature of the reactor is raised preferably to about 50 to 90° C., preferably to around 70° C.

When the inside temperature of the reactor has reached about 35 to 45° C. the one or more molecular weight regulators (chain transfer agents) are added, for instance about 0.4 to 0.8 kg.

A solution containing the one or more polymerization initiators in a solvent mixture is added. The solvent content of the polymerization initiator solvent mixture may be 75 to 95% by weight of solvent. The initial dosage of the polymerization initiator solvent mixture (initiator fed) may be for instance 0.01 to less than 0.04 kg/h. After one hour the initiator fed may be increased to 0.04 to less than 0.1 kg/h and after 2 to 4 hours to 0.1 to 0.3 kg/h.

The one or more solvents or the solvent mixture, for instance ethanol and methanol, may be added after 3 to 5 hours in a dosage of 2 to 5 kg/h (solvent fed). The jacket temperature may be raised at this time to about more than 70 to 90° C., preferably around 80° C.

The polymerization reaction may be regarded as finished after 6 to 10, or 7 to 9 hours, when the polymerization mixture has become a high viscous polymerization syrup with a conversion rate of the monomers to the copolymer of at least 99% by weight.

Polymerization Syrup

The polymerization mixture is finally polymerized to give a polymerization syrup with a conversion rate of the monomers to the copolymer of at least 99% by weight conversion.

Degassing Step

The polymerization syrup is subsequently degassed by distillation or by extrusion to remove the volatile substances. The volatile substances to be removed may be the solvent(s), residual traces of monomers which have not been polymerized and also remaining traces and reaction products of the initiator(s) or the molecular weight regulator(s).

Preferably the degassing step is performed in a twin screw extruder with one or more, preferred at least two degassing zones at temperatures of 100 to 200° C. with the 2 to 20, preferably 3 to 12% by weight of water added as an entrainer (carrier) to the polymer syrup.

The screws of the twin screw extruder may be co-rotating or in a counter-rotating.

Preferably the surfaces of the extruder screws are free from iron or contain only a low amount of iron.

Preferably the surfaces of the extruder screws are refined.

Preferably the surfaces of the extruder screws are chromated or chrome-nitrated or titan-nitrated.

This has the advantage or supports that the yellowness index (extinction at 420 nm) of the polymer product is comparably low, preferably less than 0.1, preferably less than 0.05.

The use of the entrainer is of advantage since it cools the mass down and reduces friction. Thus the degradation of the copolymer is less compared to an extrusion without the addition of water as entrainer.

Copolymer Preparation

The degassed polymerization syrup may be further comminuted to a copolymer preparation in the form of a granulate or powder. The term "granulate" shall also include porous, foam like structured granulates.

The copolymer preparation may be analysed by know analytical methods and may characterized by a a molecular weight ($M_w$) of 25.000 to 50.000, preferably 25.000 to 40.000 g/mol, a polydispersity index of 2.0 to 2.8, a residual solvent concentration of less than 10.000 ppm, preferably less than 5.000 ppm by weight, a total residual monomer content of less than 250 ppm, preferably less than 100 ppm by weight.

Analytical Methods

Analytical methods to determine the molecular weight ($M_w$=average weight molecular weight) are well known to a skilled person. In general the molecular weight $M_w$ can be determined by gel permeation chromatography or by a light-scattering method (see, for example, H. F. Mark et al., Encyclopedia of Polymer Science and Engineering, 2nd Edition, Vol. 10, pages 1 ff., J. Wiley, 1989).

Most preferred the molecular weight ($M_w$=average weight molecular weight) of the polymers described here is determined by means of size exclusion chromatography (SEC) using polyester-based packaging as the stationary phase and dimethylacetamide (DMAC) as stationary phase as described in detail in Adler et al. (2005): *Molar mass characterization of hydrophilic polymers, 2 Size exclusion chromatography of cationic (meth)acrylate copolymers, e-Polymers*, no. 057, p. 1-11 (http:/www.e-polymers.org, ISSN 1618-7229).

The polydispersity index (PDI) is well known to a skilled person and is determined by calculation of the $M_w/M_n$ ratio (weight average molecular weight/number average molecular weight). Polydispersity may be determined by gel permeation or size exclusion chromatography, light scattering measurements, direct calculation from matrix-assisted laser desorption/ionization (MALDI) or from electrospray mass spectrometry.

The residual solvent concentration may be determined by Gas Chromatography (GC). The determination of the residual solvent concentration by GC is well known to a skilled person.

The extinction at 420 nm (yellowness index) may be determined by spectrometry by use of a 12.5% by weight polymer solution in isopropyl alcohol/acetone (60:40 w/w) and a 1 cm cuvette. The test may be performed according to Ph. Eur.2.2.25.

The total and individual residual monomer contents may be preferably determined by High Pressure Liquid Chromatography (HPLC). The determination of the total and individual residual monomer contents by HPLC is well known to a skilled person.

The assay for the determination of the Alkali value AV may be performed according to Ph.Eur. 2.2.20 "Potentiometric titration" or USP <541>. 1 or 2 g Polymer (in dependence of the amount of ammino methacrylate monomer amount) are dissolved in 75 ml of glacial acetic acid at 50° C. within 30 minutes. After the solution has cooled down to room temperature add 25 ml copper (II) acetate solution (0.6% solution in glacial acetic acid). 0.1 N perchloric acid (equivalent to 20.772 mg ammonio methacrylate units) is used as the titrant.

$$\text{Ammonio methacrylate units (\%) on } DS = \frac{\text{ml } 0.1 \text{ N } HClO_4 \cdot 207.72}{\text{sample weight (g)} \cdot DS (\%)}$$

$$AV(\text{mg KOH/g } DS) = \text{ammonio methacrylate units (\%)} \cdot 2.701$$

EXAMPLES

Analytical Methods

The conversion rate of the monomers to the polymer was determined by calculation of the total monomers used at the beginning of the process in ratio to the residual monomers detected by HPLC in a sample at the end of the polymerization process before the removement of volatile substances.

The molecular weight ($M_w$=average weight molecular weight) of the polymers described here was determined by means of size exclusion chromatography (SEC) as described in detail in Adler et al. (2005) *e-Polymers*, no. 057, p. 1-11 (http:/www.e-polymers.org, ISSN 1618-7229).

The polydispersity index was determined by calculation of the $M_w/M_n$ ratio (weight average molecular weight/number average molecular weight (determined by SEC)).

The residual solvent concentration was determined by Gas Chromatography (GC).

The residual water content was determined by titration according to Karl Fischer (see for instance Eugen Scholz: *Karl-Fischer-Titration*. Springer-Verlag 1984, ISBN 3-540-12846-8 or K. Schöffski: *Die Wasserbestimmung mit Karl-Fischer-Titration*, in: *Chemie in unserer Zeit* 2000, 34, 170-175. Abstract)

The extinction at 420 nm (yellowness index) may be determined by spectrometry by use of a 12.5% by weight polymer solution in isopropyl alcohol/acetone (60:40 w/w) and a 1 cm cuvette. The test may be performed according to Ph. Eur.2.2.25.

The residual monomer contents were determined by High Pressure Liquid $NaClO_4$ solution (0.25 mol/l) the polymer was precipitated and the supernatant was analyzed by HMPC using standard reference preparations of the monomers for calibration.

The assay for the determination of the Alkali value AV was performed according to Ph.Eur. 2.2.20 "Potentiometric titration" or USP <541>. 1 or 2 g Polymer (in dependence of the amount of ammonio methacrylate monomer amount) are dissolved in 75 ml of glacial acetic acid at 50° C. within 30 minutes. After the solution has cooled down to room temperature add 25 ml copper (II) acetate solution (0.6% solution in glacial acetic acid). 0.1 N perchloric acid (equivalent to 20.772 mg ammonio methacrylate units) is used as the titrant (DS=dry substance).

$$\text{Ammonio methacrylate units (\%) on } DS = \frac{\text{ml } 0.1 \text{ N } HClO_4 \cdot 207.72}{\text{sample weight (g)} \cdot DS\ (\%)}$$

$$AV(\text{mg KOH}/g\ DS) = \text{ammonio methacrylate units (\%)} \cdot 2.701$$

Example 1

Process for Preparing a (Meth)Acrylate Copolymer of the EUDRAGIT® RS Type in 100 Liter Scale Polymerization Process The polymerization was carried out in 3.6 m³ vessel but calculated down for a 100 liter reactor using the following steps:

The polymerization reactor, a 100 l stirred vessel, is inerted by the addition of argon. Stirring was 70 rpm.

The monomer mixture, as shown in table 1 is filled into the reactor.

The jacket temperature of the reactor is raised to about 60° C.

When the inside temperature of the reactor had reached about 40° C. 0.575 Kg of the molecular weight regulator dodecylmercaptan is added.

The polymerization initiator mixture tert-butylperpivalate and tert-butylper-2-hexaonat in a solvent mixture as shown in table 2 was added. The initial dosage of the polymerization initiator solvent mixture (initiator fed) was 0.027 kg/h. After one hour the initiator fed is adjusted to 0.051 kg/h and after 3 hours to 0.158 kg/h. The Initiator fed is stopped after 5.5 hours.

After 4 hours ethanol as solvent is added in a dosage of 3.4 kg/h (solvent fed). Simultaneously the jacket temperature of the reactor is raised to 80° C. The solvent fed is stopped after 8 hours.

The polymerization reaction is regarded to be finished after 8 hours.

The overall composition of the polymerization mixture that is used respectively consumed during the process is shown in table 3.

Degassing Step

The resulting polymerization syrup is fed into a double screw extruder with co-rotating screws (Manufacturer Berstorff ZE25 with 43D) with four degassing vents. The four degassing vents comprised one backward degassing and three forward degassing zones, whereby the zones 2 and 3 where combined to one zone. The temperatures in the extruder are around 115-135° C. At the backward degassing vent and at the forward degassing vent 1 no vacuum is applied. At the degassing vents 2 and 3 a vacuum of 500 mbar is applied. As entrainer 4.5% by weight of water is added to the polymerization syrup mass after the first forward degassing zone. The relevant extrusion parameters are summarized in table 4.

Copolymer

After the extrusion the molten mass from the polymerization that was carried out in the 3.6 m³ vessel was extracted in the form of a string, cooled down by passing a water bath and subsequently comminuted to granules.

The conversion rate of the monomers to the copolymer was 99.5% by weight.

The molecular weight ($M_w$) was 28.400 g/mol. The polydispersity index was 2.2.

The residual solvent concentration of ethanol was 3,570 ppm by weight.

The residual solvent concentration of methanol was 100 ppm by weight.

The residual water content was 1.56% by weight.

The residual monomer content for 2-trimethylammoniumethyl methacrylate chloride, ethyl acrylate and methyl methacrylate was 4/59 and 14 ppm by weight.

The Alkali value AV $\text{mg}_{KOH}/\text{g}_{dry\ substance}$ was 14.7.

Tables 1-4

TABLE 1

| Monomer mixture | | |
|---|---|---|
| Monomer | kg | % by weight |
| Methyl methacrylate (MMA) | 28.9 | 58.5 |
| Ethyl acrylate (EA) | 13.4 | 27.1 |
| 2-Trimethylammoniumethyl methacrylate chloride (TMAEMC) | 2.4 | 4.9 |
| Ethanol | 2.0 | 4.1 |
| Methanol | 2.6 | 5.3 |
| total | 49.4 | 100 |

TABLE 2

| Polymerization initiator solvent mixture (initiator fed) | | |
|---|---|---|
| Initiator/solvent | kg | % by weight |
| tert-Butylperpivalat | 0.08 | 15 |
| tert-Butylper-2-ethylhexaonat | 0.02 | 3 |
| Aliphates | 0.03 | 5 |
| Ethanol | 0.42 | 77 |
| Total | 2.0 | 100 |

TABLE 3

| Total polymerization mixture as used | | |
|---|---|---|
| Components | kg | % by weight |
| MMA | 28.9 | 46.6 |
| EA | 13.4 | 21.6 |
| TMAEMC | 2.4 | 3.9 |
| Ethanol | 14 | 22.6 |
| Methanol | 3 | 4.2 |
| Dodecylmercaptan | 0.6 | 0.9 |
| tert-Butylperpivalat | 0.1 | 0.9 |
| tert-Butylper-2-ethylhexaonat | 0.02 | <0.1 |
| Aliphates | 0.03 | <0.1 |
| Total | 62 | 100 |

TABLE 4

| Extrusion parameters | |
|---|---|
| $T_{PWT}$/° C. | 125-130 |
| $P_{PWT}$/mbar | ca.15 bar |
| $T_{backward\ degassing}$/° C. | 115 |
| $P_{backward\ degassing}$/mbar | 1.000 |
| $T_{forward\ degassing\ 1-3}$/ | 135 |
| $P_{backward\ degassing\ 1}$/mbar | 1000 |
| $P_{forward\ degassing\ 2+3}$/mbar | 500 |
| Copolymer flow rate g/h | 6.400 |
| Entrainer (H₂0) % by weight | 4.5 |
| Rotation speed/rpm | 180 |

Example 2

Process for Preparing a (Meth)Acrylate Copolymer of the EUDRAGIT4D RS Type in 3.6 m³ Scale Polymerization Process The polymerization was carried out in a 3.6 m³ reactor using the following steps The polymerization reactor, a 3.6 m³ stirred vessel (EKATO®-stirrer, 2-MIG®, 1 impeller), was inerted by the addition of argon under 50 mbar pressure. Stirring was 70 rpm.

The monomer mixture, as shown in table 5 was filled into the reactor.

Stirring was started with 60 rpm.

The jacket temperature of the reactor was raised to a set value of 80° C.

When the temperature of the reactor had reached about 55° C. 19.5 Kg of the molecular weight regulator dodecylmercaptan was added through a dosing conduit. The dosing conduit was rinsed with 30 kg of ethanol.

Subsequently the polymerization initiator mixture, tert-butylperpivalate and tert-butylper-2-hexaonat, in a solvent mixture as shown in table 6 were added. The initial dosage of the polymerization initiator solvent mixture (initiator fed) was 2.6 kg/h. After one hour the initiator fed was be adjusted to 4.8 kg/h and after 3 hours to 14.8 kg/h. The Initiator fed was stopped after 5.5 hours. The dosing conduit was rinsed with about 20 kg of ethanol.

After 4.5 hours, ethanol as solvent was added in a dosage of 81.6 kg/h (solvent fed). Simultaneously the jacket temperature of the reactor was raised to 80° C. The solvent fed was stopped after 8.5 hours.

The polymerization reaction was regarded to be finished after 8 hours.

The overall composition of the polymerization mixture that was used respectively consumed during the process is shown in table 7.

Before the degassing step 340 kg ethanol were added to reduce the viscosity.

Degassing Step

The resulting polymerization syrup was fed into a double screw extruder with co-rotating screws (Manufacturer Berstorff ZE35 with 43D) with four degassing vents. The four degassing vents comprised one backward degassing and three forward degassing zones, whereby the zones 2 and 3 where combined to one zone. The temperatures in the extruder were around 115-125° C. No vacuum was applied at the degassing zones. As entrainer 9.6% by weight of water were added to the polymerization syrup mass after the first forward degassing zone.

Tables 5-7

TABLE 5

Monomer mixture

| Monomer | kg | % by weight |
|---|---|---|
| Methyl methacrylate (MMA) | 872 | 60.1 |
| Ethyl acrylate (EA) | 402 | 27.7 |
| 2-Trimethylammoniumethyl methacrylate chloride (TMAEMC) | 72.8 | 5.0 |
| Ethanol | 28 | 1.9 |
| Methanol | 76 | 5.3 |
| total | 1451 | 100 |

TABLE 6

Polymerization initiator solvent mixture (initiator fed)

| Initiator/solvent | kg | % by weight |
|---|---|---|
| tert-Butylperpivalat | 2.3 | 4.7 |
| tert-Butylper-2-ethylhexaonat | 0.4 | 0.8 |
| Aliphates | 0.8 | 1.6 |
| Ethanol | 46.5 | 93 |
| Total | 50 | 100 |

TABLE 7

Total polymerization mixture as used

| Components | kg | % by weight |
|---|---|---|
| MMA | 872 | 46.0 |
| EA | 402 | 21.2 |
| TMAEMC | 73 | 3.8 |
| Ethanol | 450 | 23.7 |
| Methanol | 76 | 4.0 |
| Dodecylmercaptan | 20 | 1.0 |
| tert-Butylperpivalat | 2.3 | 0.1 |
| tert-Butylper-2-ethylhexaonat | 0.4 | <0.1 |
| Aliphates | 0.8 | <0.1 |
| Total | 62 | 100 |

Copolymer

After the extrusion the molten mass was extracted in the form of a string, cooled down by passing a water bath and subsequently comminuted to granules.

The conversion rate of the monomers to the copolymer was 99.5% by weight.

The molecular weight (Mw) was 28.600 g/mol

The polydispersity index was 2.3.

The residual solvent concentration of ethanol was 4,100 ppm by weight.

The residual solvent concentration of methanol was 120 ppm by weight.

The residual water content was 0.23% by weight.

The residual monomer content for 2-trimethylammoniumethyl methacrylate chloride, ethyl acrylate and methyl methacrylate was 5/50 and 12 ppm by weight.

The Alkali value AV mgKOH/g dry substance was 15.0

Example 3

Process for Preparing a (Meth)Acrylate Copolymer of the EUDRAGIT® RL Type in 100 Liter Scale Polymerization Process The polymerization was carried out in a 100 liter reactor using the following steps The polymerization reactor, a 100 l stirred vessel, was inerted by the addition of argon. Stirring was 70 rpm.

The monomer mixture, as shown in table 8 was filled into the reactor.

The jacket temperature of the reactor was raised to about 60° C.

When the inside temperature of the reactor had reached about 40° C. 0.450 kg of the molecular weight regulator dodecylmercaptan was added.

Subsequently the polymerization initiator mixture, tert-butylperpivalate and tert-butylper-2-hexaonat, in a solvent mixture as shown in table 9 was added. The initial dosage of the polymerization initiator solvent mixture (initiator fed) was 0.069 kg/h. After one hour the initiator fed was be adjusted to 0.103 kg/h and after 3 hours to 0.240 kg/h. The Initiator fed was stopped after 5.5 hours.

After 4 hours ethanol as solvent was added in a dosage of 3.3 kg/h (solvent fed). Simultaneously the jacket temperature of the reactor was raised to 80° C. The solvent fed was stopped after 8 hours.

The polymerization reaction was regarded to be finished after 8 hours.

The overall composition of the polymerization mixture that was used respectively consumed during the process is shown in table 10.

Degassing Step

The resulting polymerization syrup was fed into a double screw extruder with co-rotating screws (Manufacturer Berstorff ZE35 with 43D) with four degassing vents, one backward and three forward domes. The temperatures in the extruder were around 125-130° C. At the forward degassing vent 1 no vacuum was applied. At the forward degassing vents 2 and 3 a vacuum of 500 mbar was applied. As entrainer 4.5% by weight of water were added to the polymerization syrup mass after the first forward degassing zone. The relevant extrusion parameters are summarized in table 11.

Copolymer

After the extrusion the molten mass was extracted in the form of a string, cooled down by passing a water bath and subsequently comminuted to granules.

The conversion rate of the monomers to the copolymer was 99.8% by weight.

The molecular weight ($M_w$) was 32.600 g/mol.

The polydispersity index was 2.9.

The residual solvent concentration of ethanol was 6.725 ppm by weight.

The residual solvent concentration of methanol was 445 ppm by weight.

The residual water content was 1.4% by weight.

The residual monomer content for 2-trimethylammoniumethyl methacrylate chloride, ethyl acrylate and methyl methacrylate was 6/25 and 27 ppm by weight.

The Alkali value AV $mg_{KOH}/g_{dry\ substance}$ was 27.9.

Tables 8-11

TABLE 8

| Monomer mixture | | |
|---|---|---|
| Monomer | kg | % by weight |
| Methyl methacrylate (MMA) | 24.9 | 50.3 |
| Ethyl acrylate (EA) | 12.7 | 25.6 |
| 2-Trimethylammoniumethyl methacrylate chloride (TMAEMC) | 4.4 | 8.9 |
| Ethanol | 2.7 | 5.4 |
| Methanol | 4.8 | 9.7 |
| total | 49.6 | 100 |

TABLE 9

| Polymerization initiator solvent mixture (initiator fed) | | |
|---|---|---|
| Initiator/solvent | kg | % by weight |
| tert-Butylperpivalat | 0.21 | 15 |
| tert-Butylper-2-ethylhexaonat | 0.04 | 3 |
| Aliphates | 0.07 | 3 |
| Ethanol | 1.08 | 77 |
| Total | 1.40 | 100 |

TABLE 10

| Total polymerization mixture as used | | |
|---|---|---|
| Components | kg | % by weight |
| MMA | 24.9 | 40.2 |
| EA | 12.7 | 20.5 |
| TMAEMC | 4.4 | 7.1 |
| Ethanol | 14 | 23.1 |
| Methanol | 5 | 7.8 |
| Dodecylmercaptan | 0.6 | 0.9 |
| tert-Butylperpivalate | 0.1 | 0.2 |
| tert-Butylper-2-ethylhexaonate | 0.02 | <0.1 |
| Aliphates | 0.04 | <0.1 |
| Total | 62 | 100 |

TABLE 11

| Extrusion parameters | |
|---|---|
| $T_{PWT}/°C.$ | 125-130 |
| $P_{PWT}/mbar$ | ca. 15 bar |
| $T_{backward\ degassing}/°C.$ | 115 |
| $P_{backward\ degassing}/mbar$ | 1.000 |
| $T_{forward\ degassing\ 1-3}/$ | 135 |
| $P_{forward\ degassing\ 1}/mbar$ | 1000 |
| $P_{forward\ degassing\ 2+3}/mbar$ | 500 |
| Copolymer flow rate g/h | 6.300 |
| Entrainer (H$_2$0) % by weight | 4.5 |
| Rotation speed/rpm | 180 |

The invention claimed is:

1. A process for preparing a (meth)acrylate copolymer, the process comprising:
adding a polymerization initiator and a solvent or a solvent mixture to a monomer mixture, thereby obtaining a polymerization mixture,
dissolving monomers of the monomer mixture and the polymerization initiator,
polymerizing the polymerization mixture at the temperature from 30 to 120° C. over a period of from 2 to 24 hours, thereby obtaining a polymerization syrup with a conversion of the monomers to the copolymer of at least 99% by weight,
subsequently degassing the polymerization syrup by distillation or by extrusion, thereby obtaining a degassed polymerization syrup, and comminuting the degassed polymerization syrup to a copolymer preparation as a granulate or powder,
wherein the monomer mixture comprises:
from 80 to 99% by weight of a $C_1$-$C_4$-alkyl ester of acrylic acid or a $C_1$-$C_4$-alkyl ester of methacrylic acid, from 1 to 20% by weight of the alkyl ester of acrylic acid or the alkyl ester of methacrylic acid with a quaternary ammonium group in an alkyl radical, and from 0 to 10% of a further-copolymerizable vinyl monomer,
wherein the copolymer comprises the quaternary ammonium group,
wherein the polymerization mixture comprises: at least 98% by weight of a total amount of the following components comprising, from 50 to 80% by weight of the monomer mixture, from 0.01 to 5% by weight of the polymerization initiator, and from 20 to 50% by weight of the solvent or the solvent mixture, and
wherein the copolymer preparation has: a weight average molecular weight of from 25,000 to 50,000, a polydispersity index of from 2.0 to 3.2, and a residual solvent concentration of less than 10,000 ppm by weight.

2. The process of claim 1,
wherein the monomer mixture consists of:
from 50 to 70% by weight of methyl methacrylate,
from 20 to 40% by weight of ethyl acrylate, and
from 2 to 7% by weight of 2-trimethylammoniumethyl methacrylate chloride,
wherein a total amount of the monomers adds up to 100%.

3. The process of claim 1,
wherein the monomer mixture consists of:
from 50 to 70% by weight of methyl methacrylate,
from 20 to 40% by weight of ethyl acrylate, and
from 7 to 15% by weight of 2-trimethylammoniumethyl methacrylate chloride,
wherein a total amount of the monomers adds up to 100%.

4. The process of claim 1,
wherein the solvent or the solvent mixture comprises:
more than 95% by weight of at least one solvent selected from the group consisting of ethanol, methanol, iso-propyl alcohol, n-butyl alcohol, iso-butyl alcohol, tetrahydrofuran, methyl ethyl ketone, methyl iso-butyl ketone, dioxane, acetone, ethyl acetate, and butyl acetate and
less than 5% by weight of other solvents.

5. The process of claim 4,
wherein the solvent or the solvent mixture comprises:
at least 95% by weight of ethanol, or methanol, or both and
less than 5% by weight of other solvents.

6. The process of claim 5,
wherein the solvent mixture comprises:
at least 98% by weight of from 50 to 70% by weight of ethanol and
from 50 to 30% by weight of methanol,
less than 5% by weight of water, and
less than 1% by weight of an aliphatic solvent.

7. The process of claim 1, wherein the polymerization initiator is tert-butylperpivalate or tert-butylper-2-ethylhexanoate.

8. The process of claim 1, wherein the degassing comprises degassing in a twin screw extruder with two degassing zones at temperatures of from 100 to 200° C. with from 2 to 20% by weight of water added as an entrainer to the polymerization syrup.

9. The process of claim 1, wherein the polymerization mixture comprising:
at least 98% by weight of a total amount of the following components comprising:
from 50 to 80% by weight of the monomer mixture;
from 0.01 to 5% by weight of a polymerization initiator;
greater than 0 and at most 2% by weight of a molecular weight regulator; and
from 20 to 50% by weight of a solvent or a solvent mixture.

10. The process of claim 9, wherein the molecular weight regulator is dodecylmercaptan.

11. The process of claim 1, wherein the monomer mixture comprises:
from 88 to 98% by weight of the $C_1$-$C_4$-alkyl ester of acrylic acid or the $C_1$-$C_4$-alkyl ester of methacrylic acid,
from 2 to 12% by weight of the alkyl ester of acrylic acid or the alkyl ester of methacrylic acid with the quaternary ammonium group in the alkyl radical, and at most 2% of the further-copolymerizable vinyl monomer.

12. The process of claim 9, wherein the polymerization mixture comprises: at least 98% by weight of a total amount of the following components comprising, from 55 to 70% by weight of the monomer mixture, from 0.05 to 0.2% by weight of the polymerization initiator, from 0.5 to 1.5% by weight of the molecular weight regulator, and from 25 to 35% by weight of the solvent or the solvent mixture.

13. The process of claim 1, wherein the copolymer preparation has: a weight average molecular weight of from 28,000 to 40,000, a polydispersity index of from 2.0 to 3.0, and a residual solvent concentration of less than 8,000 ppm by weight.

14. The process of claim 9, wherein the copolymer preparation has: a weight average molecular weight of from 28,000 to 40,000, a polydispersity index of from 2.0 to 3.0, and a residual solvent concentration of less than 8,000 ppm by weight.

15. The process of claim 1, wherein the monomer mixture comprises:
65% by weight of methyl methacrylate, 30% by weight of ethyl acrylate, and
5% by weight of 2-trimethylammoniumethyl methacrylate chloride.

16. The process of claim 9, wherein the monomer mixture comprises:
65% by weight of methyl methacrylate, 30% by weight of ethyl acrylate, and
5% by weight of 2-trimethylammoniumethyl methacrylate chloride.

17. The process of claim 1, wherein the monomer mixture comprises:
60% by weight of methyl methacrylate, 30% by weight of ethyl acrylate, and 10% by weight of 2-trimethylammoniumethyl methacrylate chloride.

18. The process of claim 9, wherein the monomer mixture comprises:
60% by weight of methyl methacrylate, 30% by weight of ethyl acrylate, and 10% by weight of 2-trimethylammoniumethyl methacrylate chloride.

* * * * *